Figure 1:
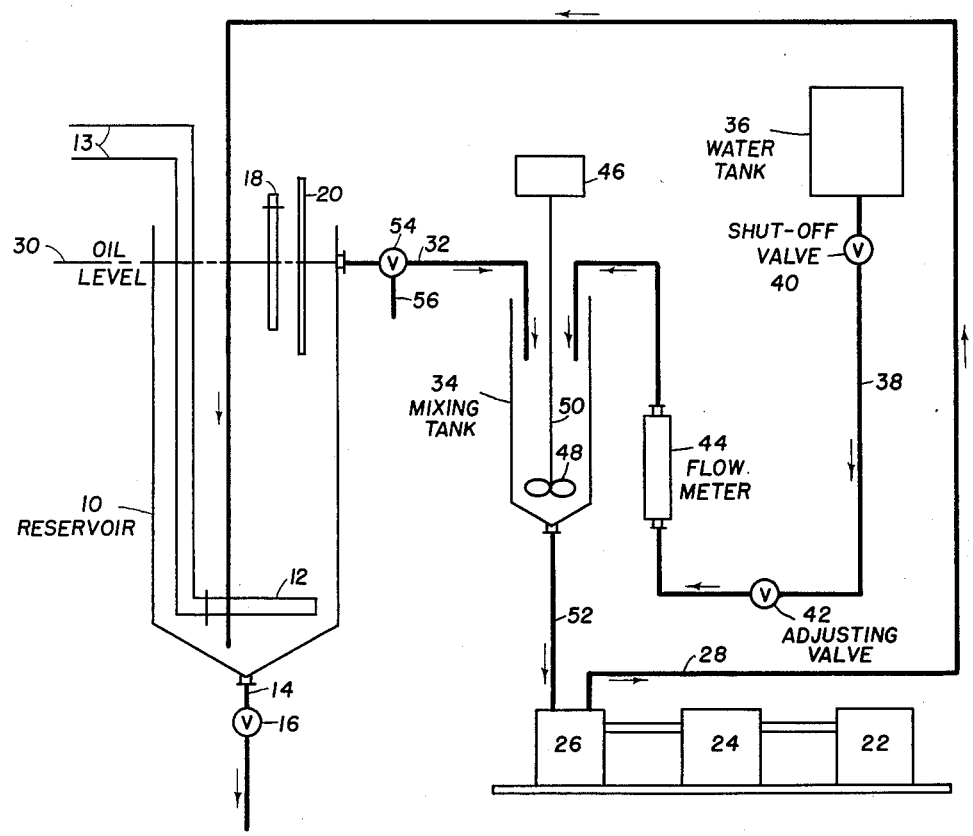

FIG. I

INVENTORS
ROBERT G. MOYER
ELMER W. BRENNAN
BY
ATTORNEY

United States Patent Office 3,020,747
Patented Feb. 13, 1962

3,020,747
DYNAMIC DEMULSIBILITY METHOD
AND APPARATUS
Elmer W. Brennan, West Dundee, and Robert G. Moyer, Nunda Township, McHenry County, Ill., assignors to The Pure Oil Company, Chicago, Ill., a corporation of Ohio
Filed Mar. 11, 1960, Ser. No. 14,349
8 Claims. (Cl. 73—53)

The present invention is related to a method and apparatus for determining the demulsibility propensity of liquid-liquid systems, i.e., the service demulsibility characteristics of oils. More specifically, the invention relates to a method and apparatus for determining the dynamic demulsibility of liquid-liquid systems under conditions which give an evaluation of the one of said liquids, as for example a lubricating oil, comparable to the findings under service conditions. This application is a continuation-in-part of application Serial Number 529,552, filed August 19, 1955, by the same inventors. The invention will be described in relation to water contamination of oils during use and tests relating to the dynamic demulsibility of fluids heavier than water, i.e., having specific gravities greater than 1.0.

The final criterion of an industrial lubricating oil, as typified by a paper-machine oil or turbine oil, is its performance under service conditions. While numerous tests have been devised by which a given oil may be judged or compared with other oils for a given purpose, it is generally known that these tests often do not rate the oils in the order of performance level which subsequent commercial service reveals. Consequently, the only real test of an oil is its behavior under actual or simulated normal commercial operating conditions. Full-scale tests take considerable time, and are undertaken with grave misgivings because of the danger and risk of damaging large and expensive machinery, as for example, paper-making machines or steam turbines.

What has been said of lubricating oil tests generally is particularly true for demulsification tests. One of the oldest and most widely applied tests is the Herschel Demulsibility Test, which measures the rate of oil separation from a water-oil emulsion. This test is run as follows:

To 53 cc. of distilled water in a chemically cleaned cylinder is added 27 cc. of the oil to be tested. The cylinder is then placed in a bath and its temperature raised to 130° F. ±1° F. (or 180° F. ±1° F.) The sample is stirred by rotating the paddle at 1500 r.p.m. for exactly five minutes. The paddle is then stopped, withdrawn from the cylinder and wiped clean with the finger or rubber policeman, returning to the cylinder as much of the emulsion as possible. The temperature of the cylinder is maintained at 130° F. (or 180° F.) throughout the test. The position of the line of demarcation between the topmost layer of oil and adjacent emulsion is read one minute after rotation of the paddle has been stopped and at one minute intervals thereafter for 35 minutes, until the rate of settling has reached the maximum and then decreased. With oils which act normally, the rate of settling out of the oil increases up to a maximum and then decreases. The maximum rate of settling, in cubic centimeters per hour, is called the demulsibility of the oil and is recorded as the numerical result of the test.

The formula for calculating the rate is:

$$\frac{60}{\text{Time of Settling (min)}} \times \text{cc. oil separated} = \text{Rate}$$

For example, with a time interval of maximum settling rate of 5 minutes and a value of 20 cc. for the separated oil, the rate will equal: $60/5 \times 20 = 240$.

Another related test is the so-called test for steam emulsion of lubricating oils, known formally as ASTM D157–51T. This test is commonly used for turbine oils, but also may be used for other lubricating oils. The steam emulsion number obtained by this test is the number of seconds required for an oil to separate, under definitely prescribed conditions, from a water emulsion after having been emulsified with the water. The test results obtained by the Herschel method and the ASTM D157–51T method are typical of tests which are lacking in correlation with field performance. Typical results obtained by these tests, illustrating the lack of correlation, will subsequently be compared with results obtained by the present method and apparatus.

Accordingly, the present invention relates to a dynamic demulsibility test apparatus and method wherein a given volume of oil sample is continuously circulated from a constant-level and constant-temperature reservoir into a mixing chamber where it is thoroughly mixed with water under conditions and at a rate which are adjustable to correspond with normal commercial operating or service conditions for the oil, and from which it is returned to the reservoir. The time, temperatures, flow rates, mixing rates and circulation rates are all adjustable, and samples may be taken from certain places in the system for determination of the proportions of oils and water present to indicate the ability of the oil to separate from the water. The oil is circulated at rates which provide reservoir residence times the same, or variable within the same limits, as those used in commercial applications of the oil. The water-contamination rate is adjusted to provide a relatively severe condition or to parallel the contamination conditions to which the oil will be subjected in commercial applications. These rates, in addition to the temperatures, conditions of mixing and settling, and the length of the test period, will vary in accordance with the particular industrial application for which the oil is formulated, the type of oil, and other factors, such as the amount of water contamination which may be present.

The dynamic demulsibility values will reflect the amount of water taken up by the oil and carried thereby to the parts being lubricated. Dynamic demulsibility values may be determined at various intervals during the test period or only at the end of the test. Comparisons of test results may be made to show any rates of change of demulsibility with time.

Figure 2:
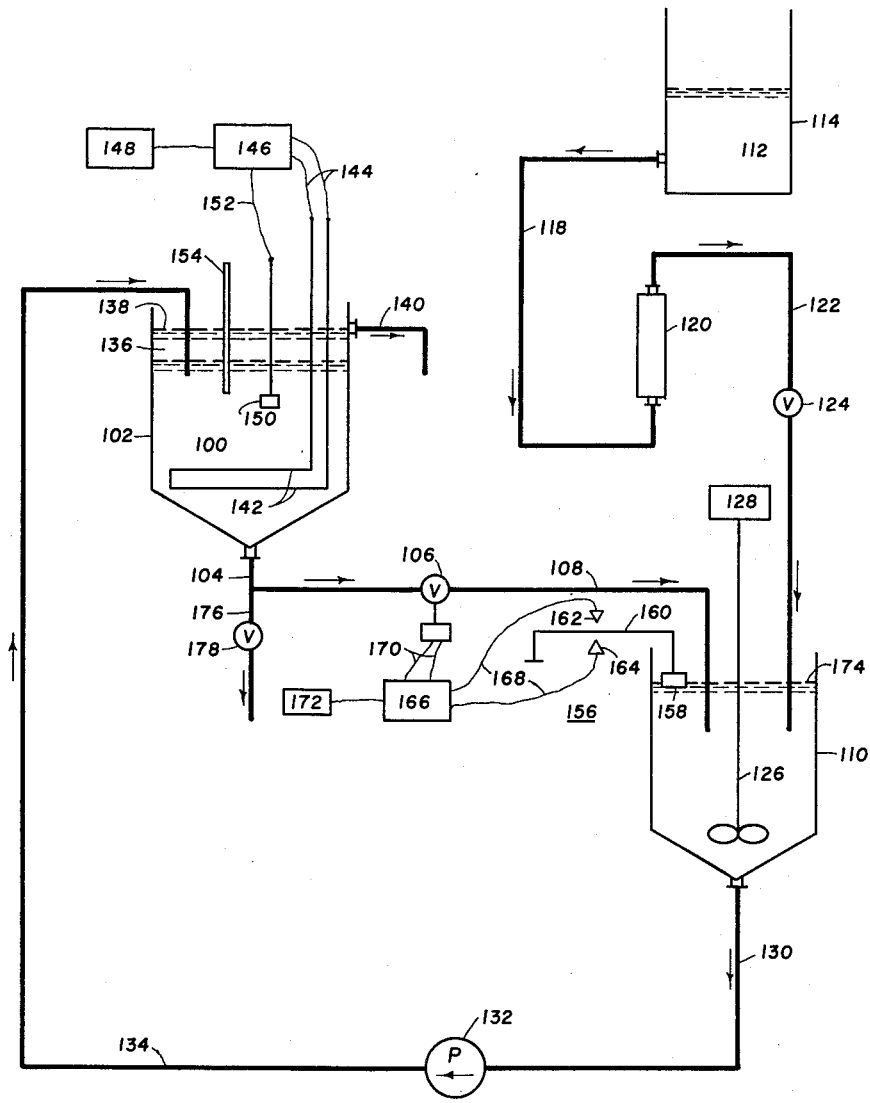

Primarily, the object of our invention is, therefore, to provide a method and apparatus for determining, experimentally, the service demulsibility properties of one liquid with another, as for example lubricating oil used in the presence of water. Another object of this invention is to provide a method and apparatus for ascertaining the dynamic demulsibility of fluids heavier than water when the fluids are intimately contacted with water. This object and further objects will become apparent and will be described in the following description of the invention. The invention is illustrated in the drawings, wherein:

FIGURE 1 is a schematic representation of the apparatus as applied to liquids that are lighter than water, and FIGURE 2 is a schematic representation of the apparatus as applied to liquids that are heavier than water.

The invention as applied to liquids lighter than water is described by reference to FIGURE 1 which schematically represent one embodiment of our apparatus, with certain of the parts shown diagrammatically. In FIGURE 1, reservoir 10 having a capacity of 2½ gallons is provided with heater 12 and draw-off line 14, controlled by valve 16. Heater 12 may comprise any form of heating element designed to bring the oil to temperatures above room temperature with a maximum temperature of about 200° F. being attainable. Reservoir 10 is fitted with thermostatic control 18 which is connected with heating element 12 by electrical circuit 13 for the purpose of maintaining the reservoir fluid temperature within plus or minus 2° F. of the desired test temperature. Thermometer 20 is provided to measure the temperature of the oil, but a thermocouple may also be employed. Motor 22 operates through gear reducer 24 to turn pump 26. Conduit 28 leads from pump 26 downward through the top of the reservoir. The oil will seek level 30 in reservoir 10, controlled by overflow 32. Oil flowing through overflow 32 drops into mixing tank 34 wherein it meets water from tank 36 flowing through conduit 38, controlled by valves 40 and 42. Flowmeter 44 is provided within conduit 38 to measure the rate of water addition or contamination that has been established. Valve 40 may be used as a shut-off valve, and valve 42 as an adjusting valve, for the purpose of controlling the rate of addition of water in relation to the oil-circulation rate to closely simulate industrial conditions. A T-blade stirrer 46 operates within mixer 34, the stirrer or impeller blade being represented as 48 and operating from shaft 50.

The overflow oil and water are thoroughly mixed within mixing tank 34 and pass through conduit 52 into the intake side of pump 26 from whence the mixture is circulated back to reservoir 10 via conduit 28. Samples are taken at draw-off 14 by means of valve 16, and from over-flow 32 by means of 3-way valve 54 and branch line 56. The water-contamination rate, controlled by valve 42 in cooperation with flowmeter 44, is subjected to variation to approach actual use conditions for the oil. In commercial use, water contamination may vary widely, depending on physical condition of the equipment components, such as gaskets, etc., and on the type of machinery being lubricated. In general, however, contamination above about 7% is prevented by mechanical maintenance and design and it has been found that contamination rates of about 2–7% of the oil circulation rate successfully emulate industrial conditions. It has been found that most oils can be satisfactorily evaluated using water-contamination rates of about 4 to 5% of the oil-circulation rate.

To initiate the tests, reservoir 10 is filled with the oil sample until the oil overflows through line 32 and fills tank 34 to about ⅓ to ¾ full and preferably to about half-full. Pump 26 is started along with stirrer 46 and the oil sample is brought to the desired temperature, which may range from room temperature to as high as 200° F. Valve 40 is opened and valve 42, in conjunction with flowmeter 44, is adjusted to provide the desired water-contamination rate. The oil-circulation rate is adjusted to maintain an oil-residence time of about 30–60 minutes in reservoir 10. A reservoir residence time of about 30 to 40 minutes has been found to be satisfactory in evaluating paper-machine oils and turbine oils. As the circulation of oil continues, liquid is intermittently or continuously withdrawn from the bottom of reservoir 10 via line 14 to maintain a constant total in the system and to compensate for the added water introduced from tank 36. Reservoir 10 and tank 34 are preferably open at the top, so that a constant check may be had on the liquid levels therein. Reservoir 10 and mixing tank 34 may have any desired capacity. The oil is continuously circulated for the designated test period which may range from 1 to 10 hours. A test period of about 6 hours gives consistent results. During this time, samples of liquid may be taken from line 14 for determination of water content, and the values so determined reported as "percent water at the draw-off." Samples also may be removed at line 56 for determination of water content and the results reported as "percent water retained in oil." At the end of the test period, before circulating pump 26 is shut off, final samples are taken from line 14 and line 56. These will constitute the main part of the test in most cases and have been found to give consistent and repeatable results.

The samples are analyzed using known methods. For example, the samples may be taken directly into centrifuge tubes and subjected to centrifuging to determine the proportions of water and oil. ASTM method D96–52 may be used. Samples may be subjected to distillation with refluxing to find the composition as by ASTM method D95–46. Another method is to dilute each sample with 50% precipitation naphtha, using the technique outlined under ASTM method D91–52.

In order to further demonstrate the invention and the numerous advantages of the test apparatus of this invention, the following experiments show that the method permits definite distinctions to be made between the demulsibility characteristics of oils which are rated as equivalents in demulsibility characteristics according to the present standard bench tests. In making these tests, a number of commercially available paper-machine oils were tested in accordance with the standard bench tests and the method just described, using a flow rate of about 4.0 gal./hr. The residence time in the reservoir was 37.5 minutes for each sample. These oils have been given the arbitrary designations A through G in the table.

TABLE I

| Oil Sample | Herschel Demul. at 130° F. | SE No. | Dynamic Demulsibility Test, 6 hrs. at 130° F. | |
|---|---|---|---|---|
| | | | H²O retained in oil | H²O in oil at draw-off |
| A | <50 | 600 | 4.2 | |
| B | 380 | 1,200+ | 3.6 | |
| C | <50 | 1,200+ | 10.5 | |
| D | <50 | 1,020 | 6.8 | |
| E | <50 | 1,200+ | 28 | 45 |
| F | <50 | 1,020 | 31 | 65 |
| G | 1,200 | 720 | 4.2 | 80 |

From Table I it is apparent that oils having the same Herschel demulsibility number at 130° F., and exhibiting different steam emulsion numbers (SE No. in the table), were found to retain different percentages of water when evaluated by the present dynamic demulsibility test. Compare, for example, oil samples A and C, and D and E. Sample B, which has a higher Herschel demulsibility than sample A and a higher steam emulsion than sample A, is shown to retain smaller amounts of water. Samples D and F which have the same Herschel demulsibility numbers and steam emulsion numbers are shown to vary greatly in the percent of water retained. Oil sample G having a very high Herschel demulsibility number and a relatively high steam emulsion number retains a relatively small percentage of water. The present test method enables one to distinguish between oils which have substantially equivalent demulsibility characteristics according to present standard bench tests, and allows more accurate evaluation of the suitability of the oils for industrial application.

The method and apparatus is used to evaluate any type of oil for demulsibility characteristics; these would include paper-machine oils, turbine oils (with additives) and base oils (without additives). It is generally desirable that such oils during use separate from water readily and thus be made available to circulate in a lubricating system to give maximum protection to the working parts without losses of lubricating properties due to retained water. In carrying out the method, the water used to make the test is maintained at the same temperature as the contaminating water in the industrial system, which generally is about 80° F. In the test apparatus, the circulation rate of the oil is selected to provide a reservoir residence time equivalent to that encountered in the anticipated industrial application, a residence period of 30–60 minutes usually being employed.

In general, when using a reservoir of about 2½ gallons capacity, circulation rates (adjusted by pump speed-reducer 24) of from about 2 to 10 gals./hr. are sufficient to encompass the normally-encountered, industrial, reservoir residence periods in use. The test method shows directly any oil loss that may be experienced due to removal by contaminating water. This value is represented by the total amount of oil removed with the water at draw-off line 14 during the test. Ideally, this value should be zero, that is, there should be no oil contamination at this point. The test method also shows directly the extent of water accumulation in the circulating oil. Unduly high water concentrations in the oil adversely affect the lubricating ability of the oil, and the "percent water retained in oil," determined on the samples withdrawn at line 56, should therefore ideally be 0%.

In comparing ratings determined by the subject method with those obtained by previous methods, those oils which have good demulsibility characteristics according to standard bench tests would be expected to show a small percent of water in the oil sampled at line 56. Comparison of samples E, F and G in Table I shows this to be true as far as the Herschel demulsibility number is concerned, but correlation with the steam emulsion numbers of these oils has been found lacking. Thus, sample G, having the lowest steam emulsion number (the test indicated demulsibility), shows the greatest percent water retained when tested by the subject method.

In order to further demonstrate the invention, a series of tests was made, using the new method and apparatus to evaluate various other oils, including base oils, turbine oils, and paper-machine oils to show oils which give acceptable results and oils which display poor demulsibility. These results are shown in the following Table II. In Table II, the individual sample numbers designate different oils evaluated and in each case the "percent water retained" and "percent water at the draw-off" were determined at the end of six hours of continuous testing. The flow rate was 4.0 gals./hr. and the residence time in the reservoir was 37.5 minutes.

TABLE II

*Dynamic demulsibility tests*

| Sample | Type | Temp., °F. | Percent Water Retained in Oil | Percent Water at Draw-Off Point |
|---|---|---|---|---|
| 1 | Base Oil | 130 | 1.5 | 98 |
| 2 | do | 130 | 16 | 85 |
| 3 | Turbine | 80 | 5.5 | 95 |
| 4 | do | 80 | 2.4 | 95 |
| 5 | do | 80 | 4.4 | 85 |
| 6 | do | 80 | 7.0 | 97 |
| 7 | do | 80 | 6.0 | 95 |
| 8 | Paper-Mach Oil | 130 | 4.8 | 75 |
| 9 | do | 130 | 3.0 | 90 |
| 10 | do | 130 | 31, 31 | 40, 40 |
| 11 | do | 130 | 14 | 100 |
| 12 | do | 130 | 24 | 90 |
| 13 | do | 130 | 12 | 90 |
| 14 | do | 130 | 14 | 75 |
| 15 | do | 130 | 10 | 85 |
| 16 | do | 130 | 11 | 70 |
| 17 | do | 130 | 16 | 80 |
| 18 | do | 130 | 14 | 100 |
| 19 | do | 130 | 14 | 90 |
| 20 | do | 130 | 12 | 100 |
| 21 | do | 130 | 10 | 98 |
| 22 | do | 130 | 10 | 80 |
| 23 | do | 130 | 10 | 80 |

Sample 1 in Table II is an example of a base oil exhibiting good demulsibility. Oil sample 2 is an example of a base oil which shows poor demulsibility. The turbine oils tested in Table II had a viscosity of about 150 SUS at 100° F. Since no correlation has been found to exist between the percent of water retained in the oil at line 56 and the percent of water at draw-off 14, each item appears to have its own significance. Sample 10 shows the repeatability of results obtained for the "percent water retained" and "percent water at draw-off."

In order to show the effect of a change in temperature, additional tests were made, evaluating paper-machine oil Samples 8 through 18 at 180° F. These results are shown in Table III.

TABLE III

*Dynamic demulsibility tests*

| Sample | Type | Temp., °F. | Percent Water Retained in Oil | Percent Water at Draw-Off Point |
|---|---|---|---|---|
| 8 | Paper-Mach Oil | 180 | 4.0 | 50 |
| 9 | do | 180 | 3.6 | 77 |
| 10 | do | 180 | 4.0 | 70 |
| 11 | do | 180 | 4.0 | 99 |
| 12 | do | 180 | 3,7 | 100, 100 |
| 13 | do | 180 | 4.0 | 98 |
| 14 | do | 180 | 8.0 | 80 |
| 15 | do | 180 | 10 | 95 |
| 16 | do | 180 | 8 | 85 |
| 17 | do | 180 | 2.5 | 90 |
| 18 | do | 180 | 5.6 | 100 |

From Table III it is seen that the demulsibility of the paper-machine oils was improved at the higher temperatures. Data obtained on Sample 12 are also illustrative of the repeatability of results that may be obtained by the subject test method. In Table III, the "percent water retained" and the "percent water at the draw-off" were determined at the end of 6-hour circulating periods.

The method of this invention is carried out by maintaining a constant supply of first test liquid in a reservoir at a substantially constant temperature, and continuously allowing the oil to overflow from the reservoir into a mixing chamber, where it is mixed with a second liquid which is continuously introduced at a rate substantially less than the circulation rate of the first liquid. The liquid-liquid mixture in the mixing chamber is maintained therein with agitation for a period of time sufficient to insure adequate mixing. The mixture from the mixing chamber is continuously withdrawn and returned to the reservoir. The rate of withdrawal of the mixture from the reservoir is such that the mixture or liquid-liquid system therein is maintained substantially quiescent for a period of time closely approximating the quiescent period of the first liquid under service conditions. At the end of, or during a predetermined time which may be from one hour to as many as 10 hours, which time is dependent upon the characteristics of the particular first liquid being tested and the type of information desired, the percent of said second liquid at the draw-off point and the percent said second liquid retained in the first liquid at the overflow point are determined. During the testing of first liquid, portions of the liquid-liquid mixture in the reservoir are removed from time to time in order to compensate for the increased volume due to the addition of said second liquid to the system. The method may be carried out by maintaining the first liquid sample at a temperature between the freezing and boiling points of said second liquid.

The apparatus broadly comprises a reservoir to contain the first liquid sample, means for maintaining a substantially constant temperature in the reservoir, means for withdrawing and circulating a constant supply of the first liquid from the reservoir and to maintain a substantially constant level therein, a mixing chamber, a conduit leading into the mixing chamber, and means associated therewith to adjust the rate of flow of second liquid, along with a return conduit and means for returning the liquid-liquid mixture back to the reservoir.

The method and apparatus are broadly applicable to those instances wherein the liquid system to be investigated is one in which a base oil, compounded oil, steam cylinder oil, paper-machine oil or turbine oil or other organic liquid is used as a lubricant, coolant, or solvent in an apparatus, process or machine wherein unwanted contamination from a second liquid, such as an aqueous medium, substantially immiscible with the first liquid, is experienced. In such instances and related systems, the invention gives a direct indication of the dynamic demulsibility propensity of the first liquid with respect to the second liquid under conditions adjustable to substantially duplicate the environment of contaminating use.

In applying the invention to liquids heavier than water, the following steps are employed in accordance with one feature of this invention: (1) The fluid under test is charged continuously to a mixing chamber at a rate such that the liquid level in the mixing chamber is maintained constant; (2) in the mixing chamber, the fluid is intimately contacted with water introduced at a fixed rate, proportional to the fluid rate; (3) the mixture of fluid and water is withdrawn at a constant rate from the bottom of the mixing vessel and transferred to an elevated settling vessel; (4) the separated fluid from the settling chamber is continuously recycled to the mixing chamber; and (5) after a preselected period of circulation, a sample of the separated test fluid from the settling chamber is withdrawn and the water content determined, this water content being inversely proportional to the demulsibility rating of the fluid.

Referring to FIGURE 2, test fluid 100, having a specific gravity greater than 1.0, is contained in settling chamber 102. After the predetermined settling period within settling chamber 102, as will be described, fluid 100 flows through line 104, solenoid-operated valve 106, and line 108 to mixing chamber 110. Water or other fluid 112 of lesser specific gravity than test fluid 100 is simultaneously admitted at a constant rate to chamber 110 from constant-head reservoir 114. The second liquid 112 flows therefrom through line 118, flowmeter 120, line 122, flow-control valve 124, into chamber 110. The test fluid 100 and the second liquid 112 as, for example, water in chamber 110, are mixed by stirrer 126 through motor 128 or other suitable means of agitation. The mixture so produced is continuously withdrawn at a constant rate from the bottom of chamber 110 by line 130 by means of constant-delivery pump 132, and is thereby transferred through line 134 back to settling chamber 102.

In chamber 102, the quiescent water-fluid mixture separates into an upper phase 136 comprising a substantial portion of liquid 112, and a lower phase comprising a substantial portion of liquid 100. A constant level, as indicated at 138 in chamber 102, and a constant volume of total fluid in the system is maintained by permitting liquid to overflow from chamber 102 through overflow line 140. The temperaure of the fluids in chamber 102 is maintained constant at a desired level by means of heater 142 which is shown connected by means of lead wires 144 to current regulator 146 and power supply 148. Thermoregulator 150, which is connected to current regulator 146 by lead wire 152, is the means for maintaining a substantially constant temperature. The temperature within the quiescent mixture in chamber 102 is indicated by thermometer 154.

The flow rate of the test fluid 100 into mixing chamber 110 is automatically regulated by means of fluid level-controller 156 having float 158 connected to arm 160 between contact points 162 and 164. The contact points are connected to current regulator 166 by means of lead wires 168, and through lead wires 170 actuate solenoid-operated valve 106. The power supply for regulator 166 is indicated at 172. The function of float level-controller 156 in combination with valve 106 is to maintain a constant liquid level as indicated by line 174 in chamber 110. From this description, it is apparent that the residence times of the fluids of fluid mixture in chamber 102 and in mixing chamber 110 are dependent upon the ratio of the volume of each chamber to the pump rate of pump 132. It is also apparent that the volume of liquid withdrawn from the system through overflow line 140 in chamber 102 must be equal to the volume of the second fluid 112 admitted to the system from constant-head reservoir 114.

A sample of the test fluid from settling chamber 102 is withdrawn through sample line 176 and valve 178, and the content of liquid 112 in the sample is determined at any time while the apparatus is in operation. This content of liquid 112 is inversely proportional to the dynamic demulsibility of the test fluid. Preferably, the sample is withdrawn at the end of a standardized period of operation, that is, after a period of a specified number of hours, in order that the results obtained with different fluids can be compared on a common basis. At the same time, a sample of the overflow fluid 136 from line 140 is taken and the amount of test fluid 100 contained therein is determined as a measure of the potential fluid loss by leaching with the second fluid, when the fluid is used commercially.

As applied to determining the dynamic demulsibility of fluids heavier than water, the method is carried out by maintaining a constant supply of the heavy (first) liquid in a reservoir at a substantially constant temperature and continuously withdrawing the heavy liquid from the bottom of the reservoir into a mixing chamber, where it is mixed with a lighter (second) liquid which is continuously introduced at a constant rate substantially less than the rate of introduction of said heavy liquid. The liquid-liquid mixture in the mixing chamber is thoroughly agitated for a period of time sufficient to insure adequate emulsification or dispersion, depending on the respective properties of the two liquids being tested. The resulting mixture from the mixing chamber is continuously withdrawn and returned to the reservoir. The rate of withdrawal of the heavy liquid from the reservoir is such that the mixture or liquid-liquid system therein is maintained substantially quiescent for a period of time closely approximating the quiescent period of the heavy liquid under service conditions. Also, the conditions of temperature applied to the reservoir are maintained or varied to approximate service conditions, at the end of, or during, a predetermined time dictated by the service conditions or other criteria of the test, which may be from about one hour to as many as 10 hours, which time is also dependent upon the characteristics of the heavy liquid being tested and the type of information desired. Samples of said mixture, a heavy liquid from said reservoir, are drawn off and the percent of said lighter liquid in the samples at the draw-off point are determined, and samples of said mixture or lighter liquid are withdrawn and the percent of said heavy liquid retained therein is determined. This sampling or withdrawal is done at the top and below the phase-separation level of the total liquid in the reservoir. During the testing for said heavy liquid, portions of the liquid-liquid mixture in the reservoir are removed from time to time in order to compensate for the increased volume due to the addition of said lighter liquid to the system. The method may be carried out by maintaining the heavy liquid at a temperature between the freezing and boiling points of the lighter liquid.

The apparatus adapted to carrying out the process as described in connection with a liquid that is heavier than water comprises a reservoir to contain the heavy liquid sample, means for maintaining a substantially constant temperature in the reservoir, means for withdrawing and circulating a constant supply of the heavy liquid to and from the reservoir and to maintain a substantially constant level or volume therein, a mixing chamber with means for agitation, means for conducting the lighter liquid to the mixing chamber, means for conducting the mixture back to the reservoir, and means associated with said conducting means to adjust the rate of flow to and from said mixing chamber at a constant rate.

The dynamic demulsibility of any heavy liquid as against a lighter liquid, where the lighter liquid is the contaminant, may be tested by the afore-described method as illustrated with a heavy liquid having a specific gravity greater than 1.0. Where the lighter liquid is water, the following non-limiting examples of heavier liquids that may be tested are given: acenaphthene, acetol, benzylacetone, acetophenone, acetyl disulfide, acrylic acid, ethyl adipate, dichloromethylarsine, benzaldehyde, bromobenzene, phenyl chloride, 1,2-dibromobenzene, benzofuran, benzoic acid esters, benzophenone, 1,4-butanediol, butyl bromides, butyl iodide, sec-butyl iodide, tert-butyl iodide, bromo-camphor, carbon disulfide, dioxane, various ethers, organometallic compounds, and the like.

The embodiments of the inventions in which an exclusive property or privilege is claimed are defined as follows:

1. The method of determining the dynamic demulsibility of a test liquid with a second liquid wherein said test liquid is heavier than said second liquid which comprises establishing a supply of said test liquid in a reservoir maintained at a substantially constant temperature, withdrawing said test liquid from the bottom of said reservoir into a mixing chamber, introducing a portion of said second liquid into said mixing chamber, said portion being in an amount substantially less than the amount of liquid in said mixing chamber, maintaining said liquids in said mixing chamber for a time sufficient to achieve substantially complete mixing thereof, withdrawing a portion of the mixture so produced and returning same to said reservoir to maintain a substantially constant volume therein, and determining the amount of said second liquid in said test liquid in said withdrawn portions as an indication of the demulsibility of said test liquid.

2. The method of determining the dynamic demulsibility of a test liquid in a second liquid wherein said test liquid is heavier than said second liquid which comprises establishing a supply of said test liquid in a reservoir maintained at a substantially constant temperature and volume continuously withdrawing a portion of said liquid from said reservoir into a mixing chamber, continuously introducing said second liquid into said mixing chamber at a controlled rate substantially less than the rate of introduction of said test liquid therein, maintaining said liquids in said mixing chamber for a time to achieve complete mixing thereof, continuously withdrawing portions of said mixture from said mixing chamber for recycle to said reservoir, and determining the relative proportions of said test liquid and said second liquid in said withdrawn portions as an indication of the dynamic demulsibility of said test liquid.

3. The method of determining the dynamic demulsibility of a test liquid with a second liquid wherein said test liquid is heavier than said second liquid which comprises maintaining a constant volume supply of said test liquid in a reservoir at a substantially constant temperature, withdrawing a portion of said test liquid from a point between the bottom and below the top of said test liquid therein, introducing said portion of said test liquid into a mixing chamber at a controlled rate to maintain a constant volume in said mixing chamber, introducing a portion of said second liquid into said mixing chamber, maintaining said liquids in said mixing chamber for a time sufficient to form a homogenous mixture thereof, recycling a portion of said mixture to said reservoir, determining the relative proportions of said test liquid and said second liquid in said withdrawn portions and recycled portions as a measure of the dynamic demulsibility of said test liquid.

4. The method in accordance with claim 1 in which said test liquid has a specific gravity greater than 1.0 and said second liquid has a specific gravity of not greater than 1.0.

5. The method in accordance with claim 4 in which the second liquid is water.

6. A dynamic demulsibility apparatus which comprises, in combination, a reservoir to contain a liquid sample, means for maintaining said liquid sample at a substantially constant temperature, means for withdrawing a constant amount of said liquid from a point below the liquid level therein, a mixing chamber connected to said withdrawal means, a supply of a second liquid, means for supplying a regulated amount of said second liquid to said mixing chamber, means for withdrawing portions of the liquid mixture in said mixing chamber and conveying same to said reservoir, said liquid mixture-withdrawal means terminating within the body of said liquid sample in said reservoir at a point below the level of any top layer of second liquid therein and above said first mentioned withdrawal means and means for maintaining a substantially constant volume of liquid in said reservoir.

7. A dynamic demulsibility apparatus comprising, in combination, a reservoir, means for indicating the temperature of said reservoir, means for maintaining said reservoir at a substantially constant temperature, means for maintaining a substantially constant level in said reservoir, a draw-off connected to the bottom of said reservoir, a control valve in said draw-off, a mixing chamber connected to said draw-off, a supply tank, a supply-tank conduit means connected between said supply tank and said mixing chamber, flow-control means in said conduit means, and a return conduit from said mixing chamber to said reservoir, said return conduit terminating in said reservoir at a point above said draw-off and below said liquid level.

8. An apparatus in accordance with claim 7 in which said flow-control means is adapted to discharge a continuous amount of liquid from said supply tank and said means for controlling the liquid level in said mixing chamber comprises a float control connected to said control valve in said draw-off.

No references cited.